United States Patent [19]
Tsujino et al.

[11] Patent Number: 5,362,428
[45] Date of Patent: Nov. 8, 1994

[54] METHOD OF MAKING A WINDOW PANEL WITH A SYNTHETIC RESIN FRAME

[75] Inventors: Masaki Tsujino; Noriyuki Yoshihara; Kazuhiko Kuga, all of Yokohama, Japan

[73] Assignee: Asahi Glass Company, Ltd., Tokyo, Japan

[21] Appl. No.: 53,357

[22] Filed: Apr. 28, 1993

[30] Foreign Application Priority Data

Apr. 28, 1992 [JP] Japan .................................. 4-135793
May 29, 1992 [JP] Japan .................................. 4-163986

[51] Int. Cl.⁵ ............................................. B29C 47/92
[52] U.S. Cl. .................................. 264/40.5; 156/107; 156/244.11; 264/40.7; 264/177.18; 264/252; 425/113; 425/466
[58] Field of Search ...................... 264/177.19, 177.17, 264/177.16, 177.10, 339, 252, 285, 40.1, 40.5, 40.7, 177.18; 425/145, 113, 150, 461, 466; 156/244.11, 108, 107

[56] References Cited

U.S. PATENT DOCUMENTS

| | | | |
|---|---|---|---|
| 4,714,425 | 12/1987 | Lenhardt | 425/461 |
| 5,067,281 | 11/1991 | Dupuy | 49/502 |
| 5,108,526 | 4/1992 | Cornils et al. | 156/244.11 |
| 5,173,148 | 12/1992 | Lisec | 156/356 |
| 5,183,612 | 2/1993 | Suita et al. | 264/177.17 |

FOREIGN PATENT DOCUMENTS

| | | |
|---|---|---|
| 0069021 | 1/1983 | European Pat. Off. ............ 264/252 |
| 0421833 | 4/1991 | European Pat. Off. . |
| 0444998 | 9/1991 | European Pat. Off. . |
| 0479677 | 4/1992 | European Pat. Off. . |
| 0493069 | 7/1992 | European Pat. Off. . |
| 0524060 | 1/1993 | European Pat. Off. . |
| 0524092 | 1/1993 | European Pat. Off. . |
| 2-76716 | 3/1990 | Japan .............................. 264/177.1 |
| 2016960 | 9/1979 | United Kingdom . |

*Primary Examiner*—Jeffery Thurlow
*Attorney, Agent, or Firm*—Oblon, Spivak, McClelland, Maier & Neustadt

[57] ABSTRACT

A method of making a window panel with a synthetic resin frame comprising forming a synthetic resin frame by extruding synthetic resin through a die into a specified shape along a peripheral portion of a plate-like material for a window on at least one surface of the plate-like material, and curing the formed synthetic resin frame so that the synthetic resin frame is formed integrally with the peripheral portion of the plate-like material, characterized in that the die is moved to trace a locus along a peripheral portion of the plate-like material which has been previously inputted, and the locus and the angular position of the die are corrected by detecting a position of the end face of the plate-like material, whereby the synthetic resin frame having a specified shape is formed.

22 Claims, 4 Drawing Sheets

METHOD OF MAKING A WINDOW PANEL WITH A SYNTHETIC RESIN FRAME

The present invention relates to a method of making a window panel with a synthetic resin frame suitable for a window glass plate for a vehicle and a window glass plate for construction.

In a window glass plate for a vehicle or for construction, a synthetic resin frame having a stripe form, gasket or the like made of synthetic resin is provided, in order to increase an ornamental effect or sealing properties, in a clearance between a plate-like material for a window which is formed of a glass plate or a plastic plate and an opening portion to which the plate-like material for a window is fixed.

Conventionally, in the fixing of this synthetic resin frame, a post-fixing method is performed, as described in, for instance, in Japanese Unexamined Patent Publication No. 158479/1982 and Japanese Unexamined Patent Publication No. 158480/1982, wherein a synthetic resin frame previously formed by an injection method or an extrusion method is bonded to a peripheral portion of a plate-like material for a window, or a gasket or a stripe material which is formed by an extrusion method is pushed into a clearance which is resulted when a plate-like material for a window is fixed to an opening portion. However, in these methods, automation of manufacturing steps is difficult since considerable steps require manual operations, and these methods push up manufacturing cost because the number of manufacturing steps is large.

In the conventional post-fixing method, a moisture hardening type urethane series sealant or a dual liquid reaction hardening type urethane series sealant is used as an adhesive agent for bonding the plate-like material for a window to the synthetic resin frame because they have a high bonding strength to glass and excellent durability. The sealant is injected in a groove which constitutes a bonding surface between the synthetic resin frame and the plate-like material for a window. However, it is difficult to uniformly and thinly form the sealant because it is a highly viscous sol-like liquid. When the synthetic resin frame is press-contacted to a surface of the plate-like material for a window, an excessive amount of the adhesive is squeezed out from an end of the bonding surface. Accordingly, it is indispensable to remove the squeezed-out portion of the adhesive by manual operations. Or an uneven surface results in a surface of the synthetic resin frame due to an uneven thickness of the applied adhesive, this providing a poor appearance.

Further, the time needed for curing the adhesive is as long as from several hours to a full day. Accordingly, a number of jigs for pressing after the synthetic resin frame is fixed to the plate-like material for a window are required, or much equipment and spaces for preserving plate-like materials until the adhesive agent is cured are required, whereby much manufacturing cost is needed.

In order to solve the above-mentioned problems, a so-called encapsulation method is proposed, as exemplified in Japanese Unexamined Patent Publication Nos. 158481/1982 and 73681/1983, wherein a synthetic resin frame is formed integrally with a peripheral portion of a plate-like material for a window by injecting synthetic resin or raw material thereof into a cavity space in a mold in which the plate-like material for a window is disposed.

In the encapsulation method, the plate-like material for a window is put in a rigid mold made of metal or the like, and synthetic resin or raw material thereof is injected into a cavity space provided by the peripheral portion of the plate-like material for a window and the inner surface of the mold. The encapsulation method has advantages of reducing labor in the molding, and the dimensional accuracy of the product is high. However, it has a serious problem that when a glass plate is used as the plate-like material for a window, the glass plate is apt to break at the time of tightening the mold plate because especially of a curved portion in the glass plate and lack of dimensional accuracy. In order to prevent the glass plate from breaking at the time of tightening the mold, an elastic material is disposed at the contact surface of the mold to the glass plate, or the mold is so contrived as to push the glass plate with a spring or the like under constant pressure. However, these measures do not solve the problem of the breaking of the plate-like material for a window.

In the injection molding method, there are many cases in which polyvinyl chloride is used as a forming material. In this case, breaking of the glass plate results even in the forming due to a forming pressure of 100 $kg/cm^2$ or more and a high temperature of about 200°, with the result of breaking of the glass plate during forming. When the breaking of the glass plate is generated, a considerable time is required to remove the fragments, and the manufacturing cost is increased by the loss of the expensive glass plate or flaws on the surface of the mold.

It is an object of the present invention to solve the disadvantages of conventional post-fixing methods wherein a synthetic resin frame previously formed by an extrusion method or an injection method is fixed to a peripheral portion of a plate-like material for a window, followed by bonding them, the disadvantages of the conventional method being such that it requires much time for bonding, much labor for finishing, it reduces dimensional accuracy and provides poor appearance, and to provide a method of making a window panel with a synthetic resin frame which eliminates the breaking of a plate-like material for a window at the time of forming.

In accordance with the present invention, there is provided a method of making a window panel with a synthetic resin frame comprising forming a synthetic resin frame by extruding synthetic resin through a die into a specified shape along a peripheral portion of a plate-like material for a window on at least one surface of the plate-like material, and curing the formed synthetic resin frame so that the plate-like material and the synthetic resin frame are made in one piece, characterized in that the die is moved to trace a locus along a peripheral portion of the plate-like material which has been previously inputted, and the locus and the angular position of the die are corrected by detecting a position of the end face of the plate-like material, whereby the synthetic resin frame having a specified shape is formed.

In the following, the present invention will be described in more detail with reference to the drawings.

Figure 1:
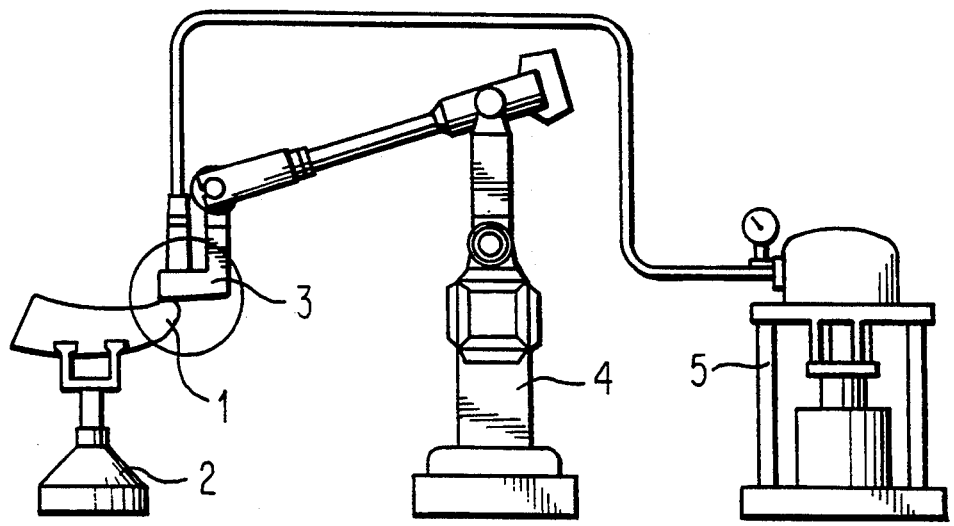
FIG. 1 is a diagram of an apparatus used for conducting the method of the present invention.
Figure 2:
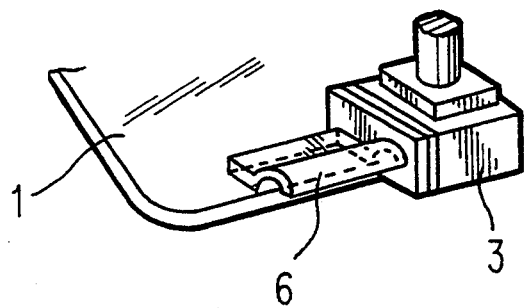
FIG. 2 is an enlarged perspective view showing a synthetic resin extruding portion in the apparatus in FIG. 1.

FIG. 1 shows an embodiment of an apparatus wherein a shaped body of synthetic resin frame is formed by extruding synthetic resin material in a specified shape along a peripheral portion of a plate-like material for a window, and FIG. 2 shows in an enlarged view a portion for extruding the synthetic resin material.

The apparatus shown in FIGS. 1 and 2 comprises a holding table 2 for securing a plate-like material for a window 1, a die 3 for extruding synthetic resin into a specified shape, a driving device 4 for moving the die 3 along the direction of a peripheral portion of the plate-like material for a window and a synthetic resin feeding device 5 for feeding the synthetic resin in a specified shape from the die 3.

The apparatus is so constructed that a shaped body of synthetic resin frame can be formed on a peripheral portion of a surface of the plate-like material for a window by extruding synthetic resin in a specified shape through the moving die 3, and then, the shaped body of synthetic resin frame is cured by heating or using a hardening method, whereby a window panel formed integrally with a synthetic resin frame can be produced.

Figure 3:
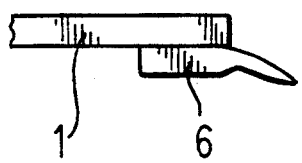
FIG. 3 is an enlarged cross-sectional view showing a peripheral portion of a window panel with a synthetic resin frame produced by the method of the present invention.
Figure 4:
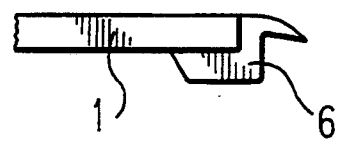
FIG. 4 is an enlarged cross-sectional view showing a peripheral portion of a window panel with a synthetic resin frame produced by the method of the present invention.
Figure 5:
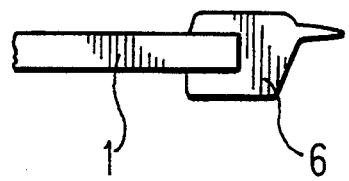
FIG. 5 is an enlarged cross-sectional view showing a peripheral portion of a window panel with a synthetic resin frame produced by the method of the present invention.

FIGS. 3 through 5 are respectively cross-sectional views showing a peripheral portion of the window panel formed by using the method of the present invention. FIG. 3 shows an embodiment wherein a synthetic resin frame 6 is formed only on a single surface of the plate-like material for a window 1, FIG. 4 shows an embodiment wherein the synthetic resin frame 6 is formed on a single surface and an end portion of the plate-like material for a window 1, and FIG. 5 shows an embodiment wherein the synthetic resin frame 6 is formed on both surfaces of the plate-like material for a window 1.

In a case of forming the synthetic resin frame 6 on the both surfaces of the plate-like material for a window 1 as shown in FIG. 5, the synthetic resin may be extruded from the die on the both surfaces simultaneously, or a shaped body of synthetic resin frame may be formed on a single surface followed by curing, and then, another a shaped body of synthetic resin frame may be formed on the opposite surface followed by curing, whereby the synthetic resin frame 6 as shown in FIG. 5 is formed.

Figure 6:
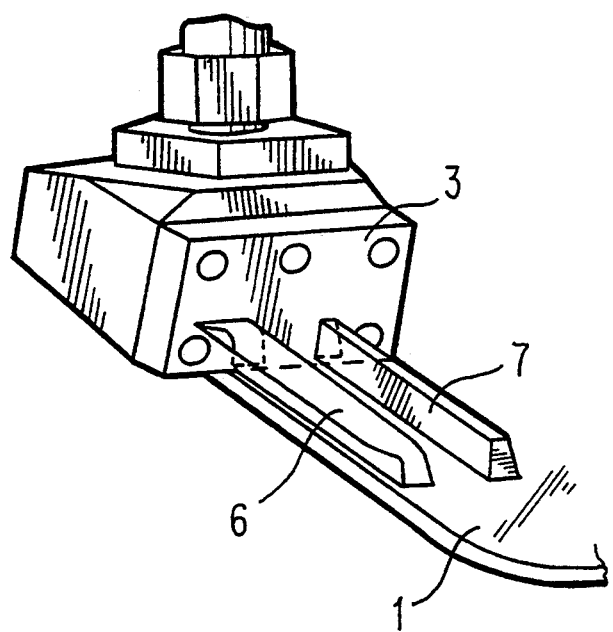
FIG. 6 is an enlarged perspective view showing another embodiment of the synthetic resin extruding portion in the apparatus shown in FIG. 1.

FIG. 6 is an enlarged perspective view showing another embodiment of the apparatus shown in FIG. 1. With use of the apparatus, the synthetic resin frame 6 and a rubber dam 7 can be formed simultaneously in a separate and independent manner at specified positions with a space therebetween on a peripheral portion of a single surface of the plate-like material for a window 1. The synthetic resin frame 6 and the rubber dam 7 may have specified shapes in cross section respectively. After the synthetic resin frame and the rubber dam have been formed integrally with the plate-like material for a window 1, they are cured by applying heat or using another hardening method, whereby a window panel with a synthetic resin frame wherein the synthetic resin frame and the rubber dam are formed integrally with the plate-like material for a window can be produced.

Figure 7:
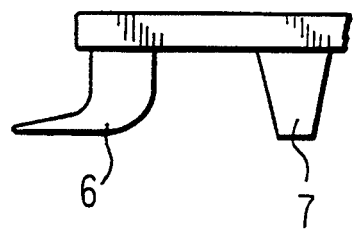
FIG. 7 is an enlarged cross-sectional view showing a peripheral portion of a window panel with a synthetic resin frame according to the present invention.
Figure 8:
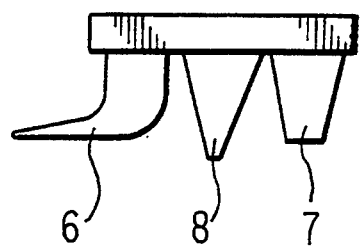
FIG. 8 is an enlarged cross-sectional view showing a peripheral portion of a window panel with a synthetic resin frame according to the present invention.

FIGS. 7 and 8 are respectively cross-sectional views showing a peripheral portion of a window panel each having a synthetic resin frame prepared by the method of the present invention.

FIG. 7 shows an embodiment wherein the synthetic resin frame 6 and the rubber dam 7 are formed only on a single surface of the plate-like material for a window 1, and FIG. 8 shows an embodiment wherein sealant as an adhesive agent is applied to the plate-like material with a synthetic resin frame so that it can be fixed to the opening portion of a window. The rubber dam 7 prevents the unnecessarily squeezing of the sealant 8 when the plate-like material for a window 1 is pushed into the opening portion of a vehicle body or the like. Further, an excellent bonding characteristic can be obtained since the plate-like material for a window is directly bonded to the vehicle body by the sealant.

Figure 10:
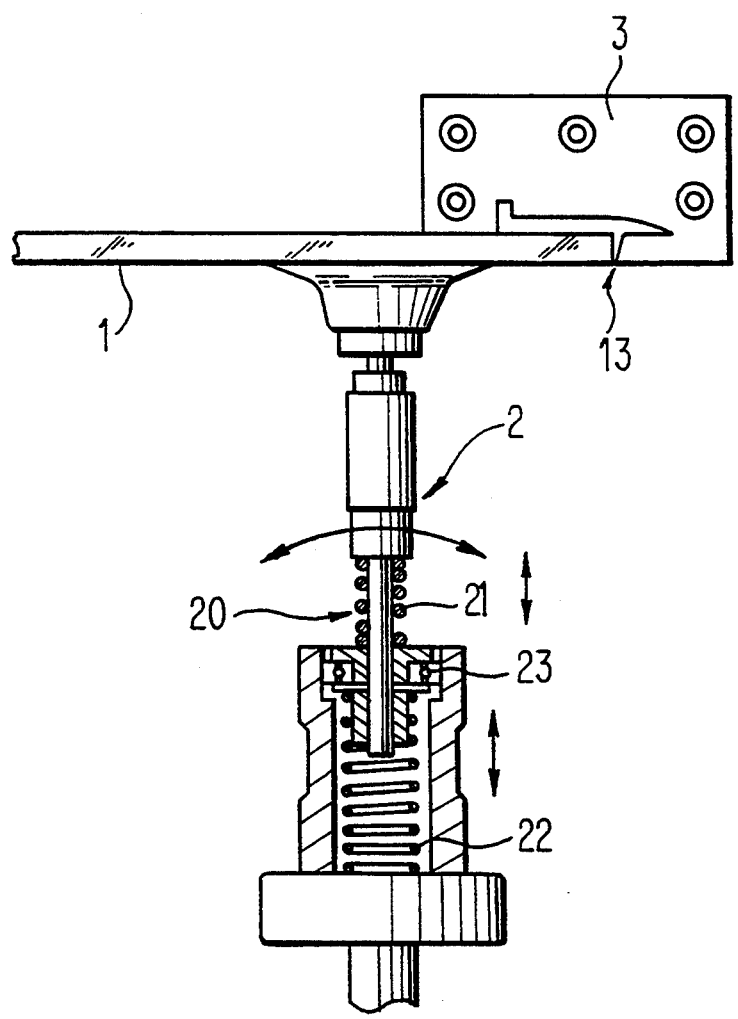
FIG. 10 is a diagram in an enlarged view showing an embodiment of a mechanism for correcting an error in a plate-like material for a window.

FIG. 10 is diagram in an enlarged view showing another embodiment of the apparatus shown in FIG. 1 wherein means for correcting an error in the plate-like material is shown in more detail. This apparatus is provided with a cushion means 20 at a holding portion of the holding table 2 for securing the plate-like material 1. In this embodiment, the cushion means 20 comprises a spring 21 capable of expanding and contracting in the vertical direction and swinging flexibly in the lateral direction, a spring 22 capable of moving the holding table 2 in the vertical direction and a bearing 23.

The die 3 is provided with a guide 13 which can be in contact with an end portion of the plate-like material 1 and to guide the die 3 so as to be movable along a peripheral portion of the plate-like material 1. The guide 13 may be formed as a portion of the die 3, or may be separately formed to be attached to a desired portion of the die. In the above-mentioned apparatus, when an edge of the plate-like material is deflected toward outside with respect to the previously inputted teaching point or the locus, the edge of the plate-like material is forced by the guide to the locus of the die by the swinging movement of the cushion means, whereby the error of the plate-like material can be corrected.

The cushion means may also be provided at a portion of the die at which the die is fixed to an arm of a robot. In this case, a sufficient correction can be made by the swinging or the expansion/contraction movement of the cushion means provided on the die and the plate-like, material respectively.

In the present invention, the die is moved accurately along a peripheral portion of the plate-like material for a window, which may have a desired shape, while the relative position and the relative angle of a free end of the die with respect to a surface of the plate-like material for a window are kept constant, and a rate of extruding the synthetic resin is correctly controlled so as to meet the moving speed of the die, whereby the synthetic resin frame having good appearance and highly accurate dimensions can be formed.

In the present invention, the driving device 4 is used to move the die on a locus which is along the shape of a peripheral portion of the plate-like material for a window, the data on the shape of the plate-like material being previously inputted as a program, whereby a window panel with a synthetic resin frame, which is usable for a window for a vehicle or construction, can be prepared.

The plate-like material for a window used for construction is generally of a flat plate type. However, the plate-like material for a window used for a vehicle is generally constituted by a complicated three-dimensional curved surface. On the other hand, the synthetic resin frame can be formed only on a part of the entire periphery of the plate-like material for a window. However, it is preferable to form the synthetic resin frame capable of covering the entire periphery of the plate-like material whereby the performance of the obtained window panel can be improved.

The die driving device should have at least well-controlled six axes in order to correctly keep the relative position and the relative angle of the die to the surface of the three-dimensional curved surface and to the entire peripheral portion of the plate-like material. When the die driving device 4 has less than six axes, the die can not completely follow the shape of the three-dimensional surface of the plate-like material for a window, and it indicates incorrect positions and assumes insufficient postures.

As the device having six axes for controlling the relative position and the relative angle of the die with respect to the plate-like material for a window, there are a gate type device and a table type device wherein the device is in combination of a wrist type triaxial device and a three-dimensional moving device which is movable in a synthesized direction in X, Y and Z coordinates. However, such type of device have problems of a complicated structure because it has to cover the entirety of the plate-like material for a window and smoothness of the movement and to move along a complicated three-dimensional curved surface. In the present invention, use of a multiaxial type robot, particularly, a robot having six axes is desired as a device for controlling the die.

In the apparatus for carrying out the method of the present invention, it is necessary to use a hose for connecting the die to the synthetic resin feeding device in order to feed the synthetic resin to the die. The hose should be rigid in order to transfer a highly viscous resin material and to reduce as possible the resistance of transfer, and has a large diameter. When the hose is not rigid, it can not withstand against the pressure of resin to be supplied, and it invites a danger of breaking or expanding abnormally. Further, it becomes impossible to stably feed the resin material due to changes of the diameter of the hose. On the other hand, when the diameter of the hose is small, the resistance of transfer of the resin to be supplied from the feeding device to the die is greatly increased, this requiring an excessive performance of discharge for the feeding device. Further, it will cause an increase in the inner pressure of the hose.

In addition, needless pressure withstand property and rigidity are required for the hose.

In the device for driving the die, it is essential to move not only the die but also the rigid and thick hose together. Namely, in the method of the present invention, it is necessary to move the die and the hose together along the entire peripheral portion of the plate-like material for a window. In other words, the die and the hose have to be rotated 360° during the movement along the entire peripheral portion. A conventional robot having six axes can not follow the above-mentioned movement. In the present invention, therefore, a preferred robot having six axes used for the die driving device has a special offset axis structure wherein the sixth axis is located outside of the own arm. Specifically, an offset arm is provided at the end portion of an arm on the sixth axis so as to be turnable around the arm on the sixth axis. The offset arm has a second turnable axis at a position away from a range of turning of the arm on the sixth axis. The hose is disposed turnably around the second turnable axis, whereby the hose is prevented from contact to the arm when it is moved around a peripheral portion of the plate-like material. Further, a rotary joint is installed between the die and the hose. With such measures, the die connected with the rigid hose can be moved to an optional position while keeping a free posture.

In a case that the plate-like material for a window is so large that the size of the synthetic resin frame to be shaped exceeds a range of the working arm of the robot having sixth axes, it is considered to elongate the length of the working arm of the robot to thereby expand a range of the shaping. However, such measures cause such disadvantages that the weight of the robot itself is increased, the moment of inertia is increased, and the performance of controlling the position of the die, which is the most important factor, is reduced. Further, there causes such inconvenience that the control of the position is insufficient even when the cooperative control is conducted. Accordingly, control in combination of the robot having six axes and the transfer of the plate-like material for a window is most desirable. In this case, the robot having six axes has to be completely associated with the transfer of the plate-like material for a window.

Further, the basic control of the robot is also an important factor in order to move the die with high precision. As the basic control, there are a position control method wherein optionally selected discontinuous positions are correctly reproduced and a locus control method wherein a continuous locus is dominantly reproduced, which are selected depending on a function to be sought. Generally, the former is suitable for a spot welding and the later is for an arc welding. In the present invention, the synthetic resin frame is continuously formed along a peripheral portion of the plate-like material for a window, and a method other than the locus control method can not be basically used in order to reproduce the locus correctly. Although a robot moved by the position control method can reproduce correctly only points at which the relative positions and the relative angles of the die with respect to the plate-like material for a window are taught, the relative positions and the relative angles of the die in the locus between the teaching points may not be correct, and it is difficult to obtain correct movement of die. Accordingly, in the present invention, it is desirable that basic control for the robot includes a position control and a locus control.

In the present invention, a 32 bits high speed arithmetic processing circuit can be used as an arithmetic processing circuit for the robot, whereby a high speed control of the relative position and the relative angle of the die as well as an improvement of placing the die at an accurate in position become possible. The high speed arithmetic processing circuit should have a function of curved line compensation so as to obtain a continuous attitude control whereby the die can follow smoothly a curved portion. Without the function of curved line compensation, the die can not perform a high speed movement, and not only an improvement in productivity can not be expected but also a non-smooth discontinuous control is caused because of delay in arithmetic processing at a curved portion.

The plate-like material for a window often has a complicated three-dimensional curved portion as described before. Such a three dimensional curvature can easily exhibit deviations in its outer dimensions, as well as deflections when the plate-like material is formed. These deviations and deflections are distributed throughout the curvature. In outer dimensions and deflection in such complicated considering that the plate-like material for a window has errors and deflection, average values are used in the determination of relative positions and relative angles of the die with respect to the plate-like material for a window, the data of which are previously inputted. Accordingly, when errors of the outer dimensions and deflection in curved portions are excessively large, there causes a change of distance between the nozzle of the die and an edge of the plate-like material whereby the die may contact with the plate, or is apart from the same. If synthetic resin is extruded under the above-mentioned circumstances, the appearance of a shaped product becomes poor, and when a window panel with the shaped product is attached to the vehicle body, a sufficient contacting state can not be obtained.

In order to eliminate such errors and deflection in the plate-like material for a window, a method of correcting the errors and deflection is necessary so that an excellent shaped product can be obtained. A method is proposed to compensate the errors and deflection at the side of the die. As a suitable means to eliminate the errors and deflection, for instance, a photosensor is provided just in front of the die so that information on the plate-like material for a window is always taken, and the relative position and the relative angle of the die with respect to the plate-like material for a window can be instantaneously corrected.

As another method, the die is attached to the robot by utilizing a spring or a gas pressure which functions as a cushion, whereby the die can be moved correctly along a peripheral portion of the plate-like material for a window.

On the other hand, correcting method to the die by taking information on the plate-like material for a window by means of the photosensor necessarily sacrifices productivity and continuity because a certain time for processing is needed for arithmetic processing and compensation. Further, when a correcting method to the attachment of the die in a flexible manner is conducted, a die fixing portion of the robot should have a sufficient strength to overcome a bend resistance to a rigid hose connected to the die which was described before, whereby the mechanism itself becomes complicated and rigid. Accordingly, a load to the robot is increased, and it is difficult to move the die with high accuracy.

An effective method of correction of the relative position and the relative angle of the die is to provide a cushion means at a portion supporting the plate-like material for a window in the same manner as that for the die, and to provide a guide member to the die with respect to an end portion of the plate-like material for a window. In this case, it is necessary to push always an edge of the plate-like material by means of the guide so that the die is not away from the plate-like material. For such purpose, the teaching point of the die should be deflected by a value of error inwardly from the regular point on the plate-like material, and further, the teaching point is determined to a lower position by an error which is caused by bending the plate-like material. For example, when the dimensions of the plate-like material is greater than the regular dimensions by an error, the guide disposed on the die pushes the plate-like material, which causes the swinging and the expansion/contraction of the cushion means, whereby the die can be moved smoothly on a peripheral portion of the plate-like material. On the other hand, when the dimensions of the plate-like material is smaller than the regular dimensions by an error, there is no danger of contact between the die and the plate-like material since the teaching point of the die is previously determined inside the plate-like material with respect to the regular dimensions of the plate-like material. The correction of error in the plate-like material described above can be applied to the correction of error caused by bending the plate-like material. Thus, the correction of the relative position and the relative angle of the die is possible without giving adverse effect to the robot.

On the other hand, it is an important factor that the synthetic resin feeding device has a stable discharging characteristic in order to obtain a resin-molded product having a stable and constant shape. The discharging characteristic of the synthetic resin feeding device influences the quality of the shaped product in the same manner as the moving speed of the die. When a rate of discharging the synthetic resin is small under a constant moving speed, the height and the width of a shaped product become thin, and on the contrary, when the rate of discharging is large, the height and the width of the shaped product is thick. Further, when the variation of the rate of discharging is large, knot-like portions are resulted in the shaped product. Accordingly, it is desirable that the synthetic resin feeding device has in its discharge line, for instance, a gear pump or the like which should have an excellent quantitative characteristic. Further, in order to obtain a constant amount of the synthetic resin to be discharged from the die, the synthetic resin feeding device itself should have a function of processing and self-control of the amount of discharging the synthetic resin.

As an alternative method, the rate of discharging of the synthetic resin is determined as a function of the pressure of the synthetic resin to be fed, and a pressure sensor is utilized to obtain a constant control of pressure, whereby a stable control of the discharging rate can be conducted. The control should be conducted near the outlet of the die to increase response of the control.

When pressure is utilized in the control of the discharging rate, the viscosity of the synthetic resin is an important factor. When the synthetic resin is relatively hard and the viscosity thereof is high, the pressure is increased, and therefore, a discharging rate should be relatively reduced in order to obtain a constant pressure. On the other hand, when the synthetic resin is relatively soft and the viscosity thereof is low, the pressure is decreased, while the discharging rate is increased. Thus, with a change of the viscosity, the control of discharging rate by means of pressure becomes insufficient. In order to eliminate such disadvantage, it is considered that the synthetic resin and a pipe line for the synthetic resin are controlled to have a constant temperature by means of an electric heater or a heating medium so that the viscosity of the synthetic resin is kept constant. By utilizing the above-mentioned technique, the discharging rate can be correctly controlled even by using pressure. Further, when there is a slight change of the viscosity, a function of correction of temperature or viscosity may be incorporated into an arithmetic calculation section in a constant discharge device, whereby the control of the discharging rate becomes reliable and accurate.

In steps of shaping the synthetic resin in the present invention, it is important to cooperatively control, without variation, the movement of the die and the discharging rate of the synthetic resin in accordance with set values. When there are variations in the moving speed and the discharging rate of the die, the height and the width of the shaped product are changed, or a portion of the shaped product is corrugated. In the worst case, a knot-like portion appears whereby the appearance is poor as mentioned before. The method of controlling the movement of the die and the stable discharge of the synthetic resin which influence the quality of the shaped product were described already.

In the following, a method of the cooperative control of the movement of the die and the discharging rate of the synthetic resin without dispersion will be described. With respect to the movement of the die, the moving speed of the die is always measured, and measured values are compared with a set value, and errors resulted in the comparison are fedback, whereby variations can be minimized. With respect to the discharging rate of the resin, the same method can be utilized. Since it is difficult to directly measure the discharging rate from the shaping device because of the characteristic of a synthetic resin material to be used, the pressure of the material is measured at a position near the nozzle of the device and the measured pressure is converted into a discharging rate, whereby a control of constant discharge rate is obtained. As a specific construction of the shaping device, a gear pump having a high quantitative characteristic is used as a feeding pump, and a discharging rate control means such as a needle valve or the like is provided so that the pressure of the synthetic resin flowing the needle valve is measured, and errors between the measured values and a set value are fedback to thereby obtain a correct control. A pressure control section should be located near the outlet of the die, whereby a quick response of the discharging rate control is obtainable, and the dispersion of the relative speed and the relative discharging rate can be minimized.

Allowable rages of dispersion of the relative speed and the relative discharging rate should respectively be 10% or lower, preferably 5% or lower.

In the cooperative control method, it is desirable to make the moving speed of the die constant. It is because the outer appearance of the shaped product having smoothness and continuity can be obtained. In the conventional method, however, the moving speed of the robot is reduced at each teaching point, and then, is returned to a set value after the teaching point has been confirmed. In other words, the conventional robot has not been able to move at a constant speed. In the present invention, a function of processing by which the moving speed of the robot is made constant at each teaching point is incorporated, whereby it is possible to move the robot continuously at a constant speed.

The plate-like material for a window has not only a linear portion but also a non-linear portion. There is a case that the moving speed of the die is reduced at a small corner in the non-linear portion in order to obtain an excellent shaped product. In this case, however, a shaped product having a specified shape in cross section can be obtained by determining functions which change the discharging rate and the moving speed while keeping a proportional relation.

When the moving speed is to be changed, an analogue output is automatically generated in correspondence to the moving speed of the robot, and the signal of the output is used so that the discharging rate can be automatically controlled.

Further, it is possible to obtain a shaped product wherein a portion of the product is gradually changed in its cross section by changing gradually the discharging rate of the synthetic resin in association with the movement of the die when the die reaches a specified position.

In the present invention, the temperature of extruding the synthetic resin from the die is in a range of 5° C.–50° C., preferably 10° C.–40° C. When temperature is lower than the above-mentioned temperature, it is necessary to keep a low temperature in order to maintain the shape of the formed product until the synthetic resin is cured. On the other hand, when temperature is higher than the above-mentioned temperature, the curing of the synthetic resin progresses during the extrusion, and pressure of extrusion becomes high, or the dimensional accuracy of the formed product becomes poor.

Although the synthetic resin can be formed into a specified shape on the plate-like material for a window which constitutes a window panel, it is necessary to keep the synthetic resin in a specified shape until the synthetic resin is cured. Accordingly, the viscosity of the synthetic resin is preferably in a range from 300,000 cp to 10,000,000 cp, more preferably, 600,000 cp to 3,000,000 cp under conditions of room temperature and a shear rate of 1/sec. When the viscosity of the synthetic resin is lower than the above-mentioned value, it is impossible to form the synthetic resin into a specified shape or to keep a specified shape until the extruded synthetic resin is cured. On the other hand, when the viscosity is higher than the above-mentioned value, the pressure of extrusion becomes excessively high.

The synthetic resin used for the present invention is such one that it cures by a chemical reaction caused in the synthetic resin itself, or by the absorbing of moisture in the air, or a physical change such as a phase change due to heating, after the synthetic resin is extruded. Polyvinyl chloride sol, urethane series sealant, silicon series sealant or the like are exemplified as the synthetic resin used.

The polyvinyl chloride sol can be cured by cooling after it has been extruded in a specified shape on a peripheral portion of the plate-like material for a window, and thereafter, the shaped product has been heated at a temperature of about 180° C.

When a dual liquid mixing type urethane series or silicon series sealant is used, the synthetic resin frame is shaped while the reaction of the sealant is not complete and it has some fluidity, and then, the shaped product is left under the room temperature, or it is heated, whereby the product is cured as a reaction progresses.

When a mono-liquid moisture curing type urethane series or silicon series sealant is used, the shaped product is cured by leaving it in the air or an atmosphere under moisture and temperature conditioning.

As the plate-like material for a window, a transparent plate made of a plastic material such as polycarbonate, acryl or an organic glass plate applied with a surface treatment onto the above-mentioned transparent plastic plate, can be used beside of a conventionally used an inorganic glass plate. Further, the synthetic resin can be extruded on a peripheral portion of the plate-like material for a window even when a coat layer for sealing, which is called a black ceramic coat film, is applied on the peripheral portion of the plate-like material. In addition, it is possible to apply primer or an adhesive agent on the plate-like material for a window in order to improve the bonding strength between the synthetic resin and the plate-like material for a window.

In the following, several examples will be described, however, the present invention is not limited to the Examples.

EXAMPLE 1

Figure 9:
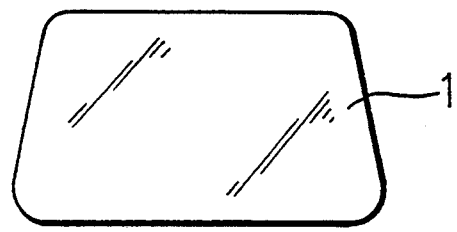
FIG. 9 is a plan view of a plate-like material for a window panel used in Examples 1 to 3.

An adhesive agent was applied onto a peripheral portion of a glass plate as a plate-like material for a window which had a shape as shown in FIG. 9 and a thickness of 3.5 mm. The glass plate was fixed by sucking disks to a holding table for fixing the plate-like material for a window. Polyvinyl chloride resin sol having a temperature of 25° C. was extruded from a die which was moved at a speed of 1 m/min along a peripheral portion of the glass plate to obtain a glass panel having a shaped polyvinyl chloride resin sol which had a shape in cross section as shown in FIG. 3. Then, the glass plate was heated at 180° C. for 10 minutes in an oven, and it was took outside to cure the shaped polyvinyl chloride resin sol. Thus, a window panel formed integrally with a synthetic resin frame was obtained. The thus obtained product had a strong bonding strength between the plate-like material for a window and the synthetic resin frame, and the appearance was excellent.

EXAMPLE 2

A shaped product of polyvinyl chloride resin sol was obtained in the same manner as in Example 1 except that it had a shape in cross section as shown in FIG. 4 and the die was moved at a speed of 3 m/min. As a result, a window panel with a synthetic resin frame having excellent bonding strength and appearance was obtained.

EXAMPLE 3

A glass primer of urethane was applied onto a peripheral portion of a glass plate as a plate-like material for a window which had a shape as shown in FIG. 9 and a thickness of 3.1 mm. The glass plate was fixed by sucking disks on a holding table for holding the plate-like material for a window. A moisture curing type monoliquid urethane sealant having a temperature of 20° C. was extruded from die which was moved at a speed of 3 m/min along a peripheral portion of the glass plate to obtain a shaped product of urethane sealant having a shape in cross section as shown in FIG. 5. Then, the moisturing and curing of the urethane sealant was conducted by leaving it for 24 hours under conditions of 25° C. and 60% RH. Thus, a window panel formed integrally with synthetic resin frame was obtained. The window panel had excellent bonding strength between the plate-like material for a window and the synthetic resin frame and appearance.

In accordance with the present invention, a synthetic resin material is extruded into a specified shape on a peripheral portion of a plate-like material for a window which may be not only flat but also of a three-dimensionally curved surface. Further, the extruded synthetic resin material is formed integrally with the plate-like material for a window. Accordingly, it is possible to greatly reduce manufacturing steps. Further, there is no danger of the breaking of a glass plate as the plate-like material for a window even when the accuracy in bending operations and dimensions are insufficient in the glass plate having a complicated three-dimensional curved surface. In accordance with the present invention, a window panel with a synthetic resin frame which is formed at an accurate position from a edge surface of the glass plate can be produced. Further, the appearance of the window panel is excellent.

What is claimed is:

1. A method of making a window panel having a synthetic resin frame, comprising:

forming a synthetic resin frame for said window panel by extruding synthetic resin through a die, which is a component of an apparatus, into a specific shape along the peripheral portion of a plate-like material to be used as a window on at least one surface of the plate-like material, said die being moved under control by information previously input into said apparatus in order to trace a locus along the periphery of the plate-like material, with the locus and the angular position of the die being corrected by detecting the position of the end face of the plate-like material, which allows for adjustment in the locus of deposit of synthetic resin onto said plate-like material, whereby the synthetic resin frame of a specific shape is formed; and curing the synthetic resin frame which is formed so that the synthetic resin frame is formed integrally with the peripheral portion of the plate-like material.

2. The method of making a window panel with a synthetic resin frame according to claim 1, wherein the die is movable along the peripheral portion of the plate-like material by means of a multiaxial robot.

3. The method of making a window panel with a synthetic resin frame according to claim 1, wherein the rate of extrusion of the synthetic resin is continuously controlled depending on the rate of movement of the die.

4. The method of making a window panel with a synthetic resin frame according to claim 1, wherein the temperature of the synthetic resin extruded from the die is in a range from 5° C. to 50° C.

5. The method of making a window panel with a synthetic resin frame according to claim 1, wherein the viscosity of the synthetic resin extruded from the die is in a range from 300,000 cp to 10,000,000 cp under the conditions of normal temperature and a rate of shear of 1/sec.

6. The method of making a window panel with a synthetic resin frame according to claim 1, wherein the synthetic resin is a member selected from the group consisting of polyvinyl chloride sol, a urethane series sealant and a silicon series sealant.

7. The method of making a window panel with a synthetic resin frame according to claim 1, wherein the shape in cross section of the formed synthetic resin frame is continuously changed along the direction of the peripheral edge of the plate-like material.

8. The method of making a window panel with a synthetic resin frame according to claim 1, wherein, upon the formation of the synthetic resin frame, a fixing member is embedded in the formed synthetic resin frame which is fixed at a position on the frame which is in the opening portion of said window.

9. The method of making a window panel with a synthetic resin frame according to claim 1, wherein the plate-like material is a transparent glass sheet, a transparent resin sheet or a composite material of glass and resin.

10. The method of making a window panel with a synthetic resin frame according to claim 1, wherein a rubber dam member is formed by extruding material on the plate-like material separately and independently when the synthetic resin frame is formed by extrusion.

11. The method of making a window panel with a synthetic resin frame according to claim 10, wherein an adhesive agent is applied onto the plate-like material at a position between the synthetic resin frame and the rubber dam member, the adhesive agent being bonded to an opening portion of said window.

12. A method of making a window panel having a synthetic resin frame, comprising:

forming a synthetic resin frame for said window panel by extruding synthetic resin through a die, which is a component of an apparatus, into a specific shape along the peripheral portion of a plate-like material for a window on at least one surface of the plate-like material, said die being moved under control by information previously input into said apparatus in order to trace a locus along the periphery of the plate-like material, with the locus and the angular position of the die being corrected by absorbing the error in the distance between a guide attached to said die and in contact with the periphery of said plate-like material, both said guide and said die being components of said apparatus, and the plate-like material by the swinging or the expansion/contraction movement of a cushion means which is a component of the means of said apparatus which holds the plate-like material; and curing the synthetic resin frame which is formed so that the synthetic resin frame is formed integrally with the peripheral portion of the plate-like material.

13. The method of making a window panel with a synthetic resin frame according to claim 12, wherein the die is movable along a peripheral portion of the plate-like material by means of a multiaxial robot.

14. The method of making a window panel with a synthetic resin frame according to claim 12, wherein the rate of extrusion of the synthetic resin is continuously controlled depending on the rate of movement of the die.

15. The method of making a window panel with a synthetic resin frame according to claim 12, wherein the temperature of the synthetic resin extruded from the die is in the range from 5° C. to 50° C.

16. The method of making a window panel with a synthetic resin frame according to claim 12, wherein the viscosity of the synthetic resin extruded from the die is in a range from 300,000 cp to 10,000,000 cp under the conditions of normal temperature and a rate of shear of 1/sec.

17. The method of making a window panel with a synthetic resin frame according to claim 12, wherein the synthetic resin is a member selected from the group consisting of polyvinyl chloride sola, urethane series sealant and a silicon series sealant.

18. The method of making a window panel with a synthetic resin frame according to claim 12, wherein the shape in cross section of the formed synthetic resin frame is continuously changed along the direction of the peripheral edge of the plate-like material.

19. The method of making a window panel with a synthetic resin frame according to claim 12 wherein, upon the formation of the synthetic resin frame, a fixing member is embedded in the formed synthetic resin frame which is at a position on the frame which is in the opening portion of said window.

20. The method of making a window panel with a synthetic resin frame according to claim 12, wherein the plate-like material is a transparent glass sheet, a transparent resin sheet or a composite material of glass and resin.

21. The method of making a window panel with a synthetic resin frame according to claim 12, wherein a rubber dam member is formed by extruding material on the plate-like material separately and independently when the synthetic resin frame is formed by extrusion.

22. The method of making a window panel with a synthetic resin frame according to claim 21, wherein an adhesive agent is applied onto the plate-like material at a position between the synthetic resin frame and the rubber dam member, the adhesive agent being bonded to an opening portion of a window.

* * * * *